(12) United States Patent
Matsui

(10) Patent No.: US 6,334,078 B1
(45) Date of Patent: Dec. 25, 2001

(54) ROBOT FOR PRODUCTION MACHINE

(75) Inventor: Atsuo Matsui, Nagano (JP)

(73) Assignee: Nissei Plastic Industrial Co. Ltd., Nagano-Ken (JP)

(*) Notice: Subject to any disclaimer, the term of this patent is extended or adjusted under 35 U.S.C. 154(b) by 0 days.

(21) Appl. No.: 09/621,624

(22) Filed: Jul. 21, 2000

(30) Foreign Application Priority Data

Jul. 23, 1999 (JP) .................................................. 11-209716

(51) Int. Cl.[7] ...................................................... G06F 19/00
(52) U.S. Cl. ........................ 700/245; 414/731; 414/735; 414/733; 249/66.1; 249/73; 74/490.03; 901/23
(58) Field of Search ............................ 700/245; 414/731, 414/735, 744.4, 917, 733, 752.1, 744.1; 249/66.1, 68, 73; 901/15, 23, 21, 40, 8; 74/490.03, 52, 110, 104, 96

(56) References Cited

U.S. PATENT DOCUMENTS

| | | | |
|---|---|---|---|
| 4,795,124 | * | 1/1989 | Nagai .................................. 249/66.1 |
| 4,813,846 | * | 3/1989 | Helms ............................... 414/744.1 |
| 4,901,589 | * | 2/1990 | Gaigl ...................................... 74/104 |
| 4,947,702 | * | 8/1990 | Kato ................................ 074/490.03 |
| 5,106,258 | * | 4/1992 | Orii ...................................... 414/733 |
| 5,197,846 | * | 3/1993 | Uno et al. ............................ 414/731 |

FOREIGN PATENT DOCUMENTS

Y2-445861    10/1992    (JP) .

OTHER PUBLICATIONS

Carter et al., Applocation of Universal Adaptive Control to a Two Link Robot, 1989, IEEE, pp. 642–645*.*

* cited by examiner

Primary Examiner—William A Cuchlinski, Jr.
Assistant Examiner—McDieunel Marc
(74) Attorney, Agent, or Firm—Birch, Stewart, Kolasch & Birch LLP

(57) ABSTRACT

A robot for a production machine includes a parallel link mechanism including opposed first and second shorter-side links and opposed first and second longer-side links which form a parallelogram. A chuck is supported on the first shorter-side link. A guide rail is fixed to a base arm in order to movably support the second shorter-side link. The base end of a drive link is rotatably attached to the base arm, and the distal end of the drive link is attached to an intermediate portion of one of the first and second longer-side links. A drive mechanism is provided in order to rotate the base end of the drive link. This structure simplifies the mechanical system and the control system, reduces a space required in the vertical direction, and increases operation speed such as product removal speed.

8 Claims, 4 Drawing Sheets

ROBOT FOR PRODUCTION MACHINE

BACKGROUND OF THE INVENTION

1. Field of the Invention

The present invention relates to a robot for a production machine which is used as a product removal apparatus for removing products from a production machine such as an injection molding machine, or as an insert-part-loading apparatus for loading an insert part into a mold.

2. Description of the Relevant Art

There has been known a product removal apparatus (robot for a production machine) which is added to an injection molding machine and which removes a product ejected from a mold by an ejector and transports the removed product to a product stocker (shooter) disposed adjacent to the injection molding machine.

A conventionally-used product removal apparatus is a traverse-type product removal apparatus which is designed to move linearly a chuck capable of holding and releasing a product along X, Y, and Z directions. However, one drawback of such a traverse-type product removal apparatus is that since the apparatus must have a size corresponding to the stroke of movement of the chuck along each direction, the apparatus is comparatively large overall, and an installation space corresponding to the stroke of movement is required.

In order to solve the above-described drawback, Japanese Utility Model Publication Nos. 4 (1992)-45861, 5 (1993)-40989, and others propose an improved product removal apparatus in which an articulated robot having a plurality of linked arm portions is used in order to reduce movement area to thereby reduce the size and installation space.

Meanwhile, a mold clamp apparatus of an injection molding machine includes four tie bars, which slidably support a movable platen to which is attached a movable mold. Therefore, a molded product must be removed through a space between the tie bars without causing interference with the tie bars. Accordingly, the chuck of a product removal apparatus must be moved linearly at least along the vertical direction, and the chuck must be maintained in a constant posture (orientation). In the case of the above-described articulated robot, since fundamental motions are produced by means of rotation of respective joint portions, when the chuck is to be moved linearly, two arm portions must be moved in a combined manner through simultaneous control of rotational angles of the two arm portions.

However, when a chuck is secured to a distal end of an articulated arm, the orientation of the chuck changes depending on the rotational angles of the arm portions. Therefore, the conventional product removal apparatus of the articulated robot type which has been provided in injection molding machines requires an additional drive mechanism for correcting the orientation of the chuck. This results in an increase in the number of parts, an increase in difficulty in designing a control system, and an increase in cost stemming from an increased degree of complexity of hardware and software. Further, the overall size and weight of the product removal apparatus increase. In particular, the conventional product removal apparatus requires a large space in the vertical direction and cannot increase the product removal speed.

SUMMARY OF THE INVENTION

An object of the present invention is to provide a robot for a production machine which is advantageously disposed in an injection molding machine and which can stably and smoothly remove a molded product through a space between tie bars without causing interference with the tie bars, even when the molded product is large.

Another object of the present invention is to provide a robot for a production machine which can simplify the mechanical system and the control system to thereby greatly reduce the overall cost of the apparatus, as well as the size and weight of the apparatus.

Still another object of the present invention is to provide a robot for a production machine which can reduce a space required in the vertical direction and increase operation speed such as product removal speed.

To achieve the objects, the present invention provides a robot for a production machine (a product removal apparatus or an insert-part-loading apparatus) comprising: a parallel link mechanism including opposed first and second shorter-side links and opposed first and second longer-side links which form a parallelogram; a chuck supported on the first shorter-side link; a guide rail fixed to a base arm and movably supporting the second shorter-side link; a drive link having a base end rotatably attached to the base arm and a distal end rotatably attached to an intermediate portion of one of the first and second longer-side links; and a drive mechanism for rotating the base end of the drive link.

By virtue of the above-structure, when the base end of the drive link is rotated by the drive mechanism, the second shorter-side link moves along the guide rail, and the first shorter-side link moves in a direction perpendicular to the direction of movement of the second shorter-side link. When the length of the longer-side links is set to two times the length of the drive link, and the distal end of the drive link is coupled to the center portion of one of the longer-side links, the first shorter-side link moves linearly or straight in the direction perpendicular to the direction of movement of the second shorter-side link. Further, since the chuck is supported on the first shorter-side link of the parallel link mechanism, the orientation (posture) of the chuck is maintained constant.

DETAILED DESCRIPTION OF THE PREFERRED EMBODIMENT

Figure 1:
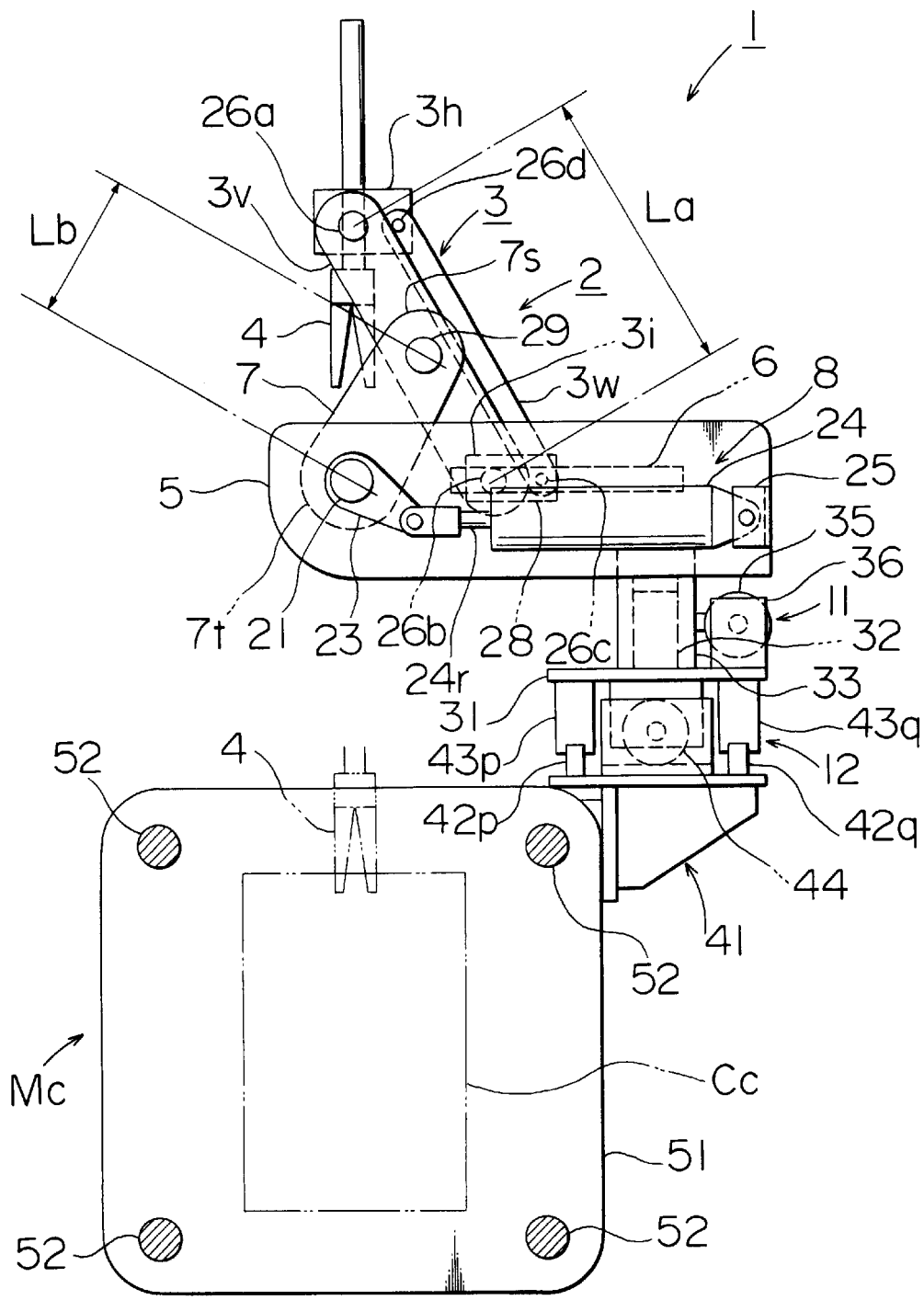
FIG. 1 is a front view of a product removal apparatus (robot for a production machine) according to an embodiment of the present invention.
Figure 2:
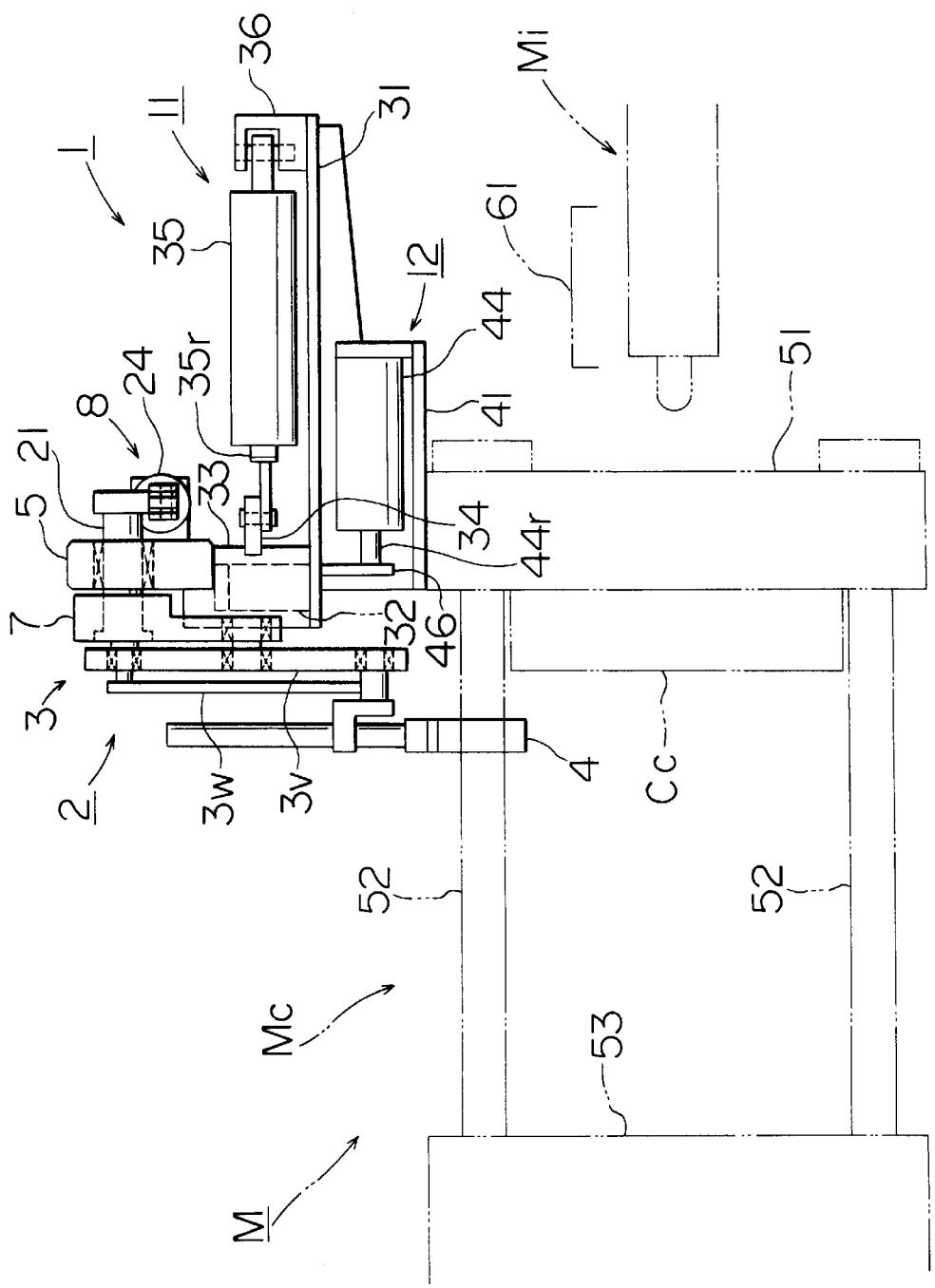
FIG. 2 is a side view of the product removal apparatus.
Figure 3:
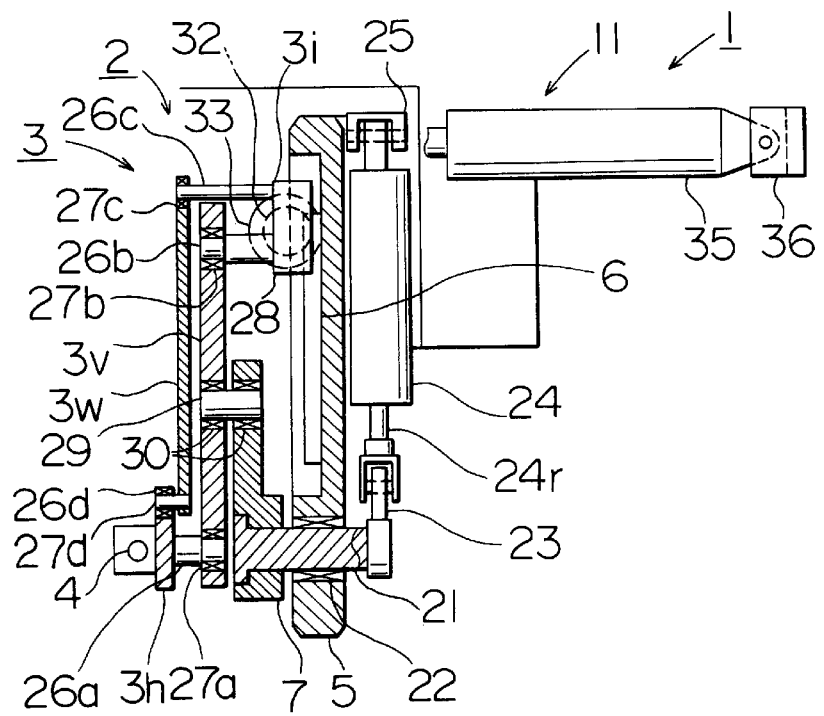
FIG. 3 is a partially-sectioned plan view of the product removal apparatus.

An embodiment of the present invention will next be described in detail with reference to the drawings. The accompanying drawings are illustrative of the embodiment and are not meant to limit the scope of the invention. In order to describe the invention clearly, detailed description of known parts is omitted.

First, the structure of a product removal apparatus (robot for a production machine) 1 according to the embodiment will be described with reference to FIGS. 1 to 4.

The product removal apparatus 1 comprises a base arm 5 which extends horizontally. A horizontally-oriented drive shaft 21 is rotatably attached to a first end of the base arm 5 via a bearing 22. Further, a drive mechanism 8 is disposed on a surface of the base arm 5, from which surface a first end of the drive shaft 21 projects. The drive mechanism 8 includes a drive lever 23 fixed to the first end of the drive shaft 21, and an air cylinder 24 for driving the drive lever 23. The rear end of the air cylinder 24 is rotatably coupled to a bracket 25 attached to a second end of the base arm 5, and a distal end of a movable rod 24r projecting from the air cylinder 24 is rotatably connected to the distal end of the drive lever 23. By virtue of this configuration, the drive shaft 21 can be rotated through drive of the air cylinder 24.

Meanwhile, a link mechanism 2 is disposed on the side of the base arm 5 to which a second end of the drive shaft 21 projects. The link mechanism 2 includes a parallel link mechanism 3 and a drive link 7. The parallel link mechanism 3 includes a pair of opposed shorter-side links 3h and 3i and a pair of opposed longer-side links 3v and 3w which form a parallelogram. The links 3h and 3v are rotatably connected to each other via a pivot shaft 26a and a bearing 27a; the links 3v and 3i are rotatably connected to each other via a pivot shaft 26b and a bearing 27b; the links 3i and 3w are rotatably connected to each other via a pivot shaft 26c and a bearing 27c; and the links 3w and 3h are rotatably connected to each other via a pivot shaft 26d and a bearing 27d. A chuck 4 is supported by the shorter-side link 3h, and the opposite shorter-side link 3i is movably supported by a horizontal guide rail 6 fixed to the base arm 5. In the present embodiment, a linear bearing is used for the guide rail 6. The shorter-side link 3i serves as a slider 28, which is movably supported by the guide rail 6. The chuck 4 has a function of holding and releasing a molded product and typically includes a holding mechanism employing vacuum suction or a mechanical holding mechanism. The distal end 7s of the drive link 7 is rotatably coupled via a shaft portion 29 to a center portion of the longer-side link 3v, and the base end 7t of the drive link 7 is fixed to the drive shaft 21. Reference numeral 30 denotes bearings.

In the present embodiment, the length La of the longer-side link 3v of the parallel link mechanism 3; i.e., the distance between the pivot shafts 26a and 26b, is set to two times the length Lb of the drive link 7; i.e., the distance between the shaft portion 29 and the drive shaft 21, and the distal end 7s of the drive link 7 is coupled to the longer-side link 3v at the center between the pivot shafts 26a and 26b.

Meanwhile, a second end of the base arm 5 is supported by a rotation drive unit 11. The rotation drive unit 11 includes a support shaft 32 projecting upward from the top face of a horizontal base plate 31, and a cylindrical bearing member 33 fixed to the second end of the base arm 5 and rotatably fitted onto the support shaft 32. Further, an air cylinder 35 is disposed on the top face of the base plate 31. The rear end of the air cylinder 35 is rotatably coupled to a bracket 36 fixed to the base plate 31; and the distal end of a movable rod 35r projecting from the air cylinder 35 is rotatably connected to the distal end of the lever 34, which projects horizontally from the outer circumferential surface of the bearing member 33. By virtue of this configuration, the base arm 5 can be rotated about the support shaft 32, through drive of the air cylinder 35.

Further, an advancement/retraction drive unit 12 for advancing and retracting the base arm 5 is provided. The advancement/retraction drive unit 12 includes a pair of linear bearings 42p and 42q fixed to the top face of a support member 41; and a pair of sliders 43p and 43q attached to the bottom surface of the base plate 31 and movably supported by the linear bearings 42p and 42q. Moreover, an air cylinder 44 is disposed on the top face of the support member 41. The distal end of a movable rod 44r projecting from the air cylinder 44 is coupled to an attachment plate 46, which is integrally provided on the base plate 31. By virtue of this configuration, the base arm 5 can be advanced and retracted through drive of the air cylinder 44.

The support member 41 is attached to an injection molding machine M. The injection molding machine M includes a mold clamping apparatus Mc and an injection apparatus Mi. The mold clamping apparatus Mc includes a stationary platen 51 to which a stationary mold Cc is attached; and an unillustrated drive-unit support platen which is fixedly disposed at a position separated from the stationary platen 51. Four tie bars (upper left, upper right, lower left, and lower right tie bars) 52 are disposed between the stationary platen 51 and the drive-unit support platen. The movable platen 53 is slidably supported on the tie bars 52. The support member 41 is attached to an upper end corner portion of the stationary platen 51 of the injection molding machine M. Meanwhile, a shooter 61 is disposed along the side of the injection apparatus Mi.

Next, operation of the product removal apparatus 1 according to the present embodiment will be described with reference to FIGS. 1 to 5.

Figure 5:
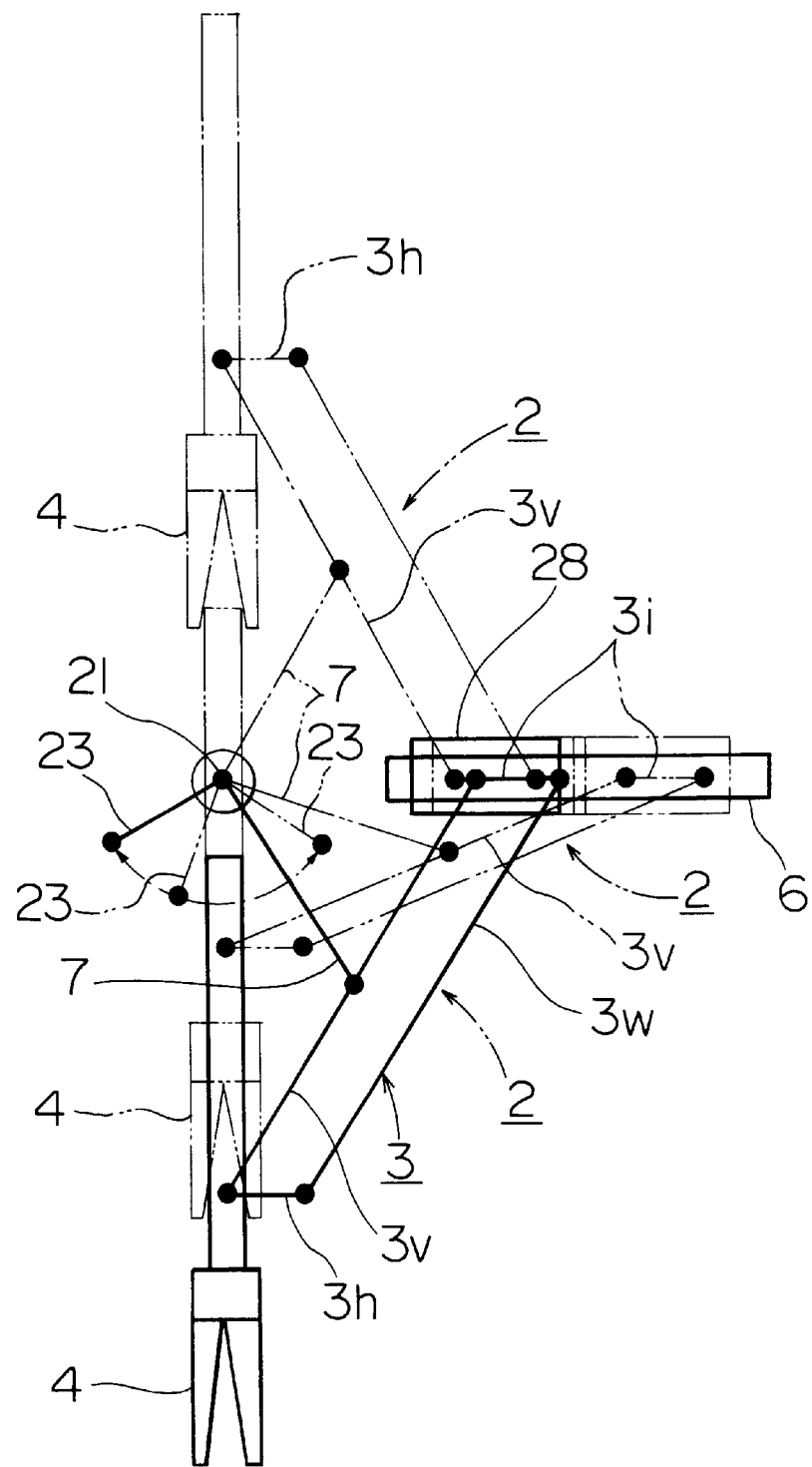
FIG. 5 is an explanatory diagram showing the principle of operation of the product removal apparatus.

Initially, the product removal apparatus 1 is located at a wait position indicated by a solid line in FIG. 1, and the chuck 4 is located at its home position. Accordingly, when the air cylinder 24 is driven after mold opening such that the movable rod 24r moves in the projecting direction, the chuck 4 moves down at high speed. That is, the drive shaft 21 rotates clockwise in FIG. 1, and the base end 7t of the drive link 7 also rotates clockwise. As a result, the shorter-side link 3i (slider 28) moves along the guide rail 6, and the shorter-side link 3h moves in a direction perpendicular to the direction of movement of the shorter-side link 3i. Since the length La of the longer-side link 3v (the distance between the pivot shafts 26a and 26b) is set to two times the length Lb of the drive link 7 (the distance between the shaft portion 29 and the drive shaft 21), and the distal end 7s of the drive link 7 is coupled to the center portion of the longer-side link 3v, the shorter-side link 3h moves straight in a direction (vertical direction) perpendicular to the direction of movement of the shorter-side link 3i. Meanwhile, since the chuck 4 is supported by the shorter-side link 3h of the parallel link mechanism 3 forming a parallelogram, the orientation (posture) of the chuck 4 is maintained constant. FIG. 5 shows the principle of operation of the link mechanism 2 in relation to movement of the chuck 4.

When the chuck 4 reaches the lowermost position indicated by an imaginary line in FIG. 1, the chuck 4 is operated to grasp a predetermined portion (e.g., a runner portion) of a molded product. Subsequently, the air cylinder 44 of the advancement/retraction drive unit 12 is driven in order to move the base arm 5 in a direction for separating from the stationary mold Cc. Subsequently, the air cylinder 24 is driven in order to move the movable rod 24r in a retracting direction, so that the chuck 4 holding the runner portion is elevated to the uppermost position indicated by a solid line in FIG. 1.

Figure 4:
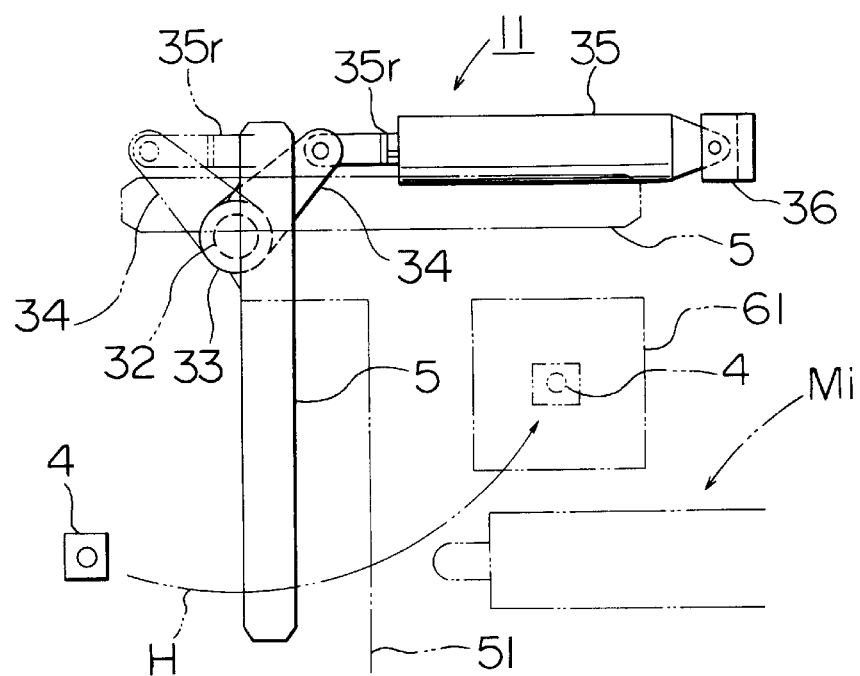
FIG. 4 is a plan view of a rotation drive unit of the product removal apparatus.

Next, as shown in FIG. 4, the air cylinder 35 is driven in order to move the movable rod 35r in a projecting direction. As a result, the bearing member 33 rotates, so that the base arm 5 rotates through an angle of about 90° from a position indicated by a solid line to a position indicated by an imaginary line. Through this rotation, the chuck 4 holding the runner portion revolves in the direction of arrow H shown in FIG. 4 and reaches a position above the shooter 61. Accordingly, when the chuck 4 is operated at this position to release the runner portion of the molded product, the molded product falls into the shooter 61. After completion of the above-described operation, the chuck 4 is returned to the home position through a reverse operation, thereby completing a single cycle of removal operation.

In the product removal apparatus 1 according to the present embodiment, the chuck 4 can be moved linearly, and the orientation (posture) of the chuck 4 can be maintained constant. Therefore, even a large molded product can be stably and smoothly removed through a space between the tie bars 52 without causing interference with the tie bars 52. Further, the mechanical system and the control system can be simplified, so that the overall cost, size, and weight of the apparatus can be reduced. In particular, the space required in the vertical direction can be reduced, and the product removal speed can be increased.

While the present invention has been described with reference to the preferred embodiment, the present invention is not limited thereto. Regarding structural details, shape, components, among others, modifications and any omission or addition may be possible as needed without departing from the scope of the invention. For example, in the above-described embodiment, the length of the longer-side link 3v is set to two times the length of the drive link 7, and the distal end of the drive link 7 is coupled to the center portion of the longer-side link 3v. However, if necessary, these relations may be changed in order to change the movement locus of the chuck 4. Further, if necessary, each of the rotation drive unit 11 and the advancement/retraction drive unit 12 may be replaced with a drive unit of any other type. In the embodiment, the robot for a production machine is used as a product removal apparatus 1 for removing a molded product from an opened mold of the injection mold machine M. However, the robot for a production machine may alternatively be used as an insert-part-loading apparatus for loading an insert part into an opened mold. In this case, in place of the shooter 61, a part stocker is disposed, and each of insert parts stored in the part stocker is removed by use of the robot for a production machine (insert-part-loading apparatus) of the present invention, and is loaded into a mold. Moreover, the application of the robot for a production machine according to the present invention is not limited to injection molding machines, and the robot for a production machine according to the present invention can be utilized in other types of production machines which are subjected to restrictions similar to those of injection molding machines.

What is claimed is:

1. A robot for a production machine comprising:

a parallel link mechanism including opposed first and second shorter-side links and opposed first and second longer-side links which form a parallelogram;

a chuck supported on the first shorter-side link;

a guide rail fixed to a base arm and movably supporting the second shorter-side link;

a drive link having a base end rotatably attached to the base arm and a distal end rotatably attached to an intermediate portion of one of the first and second longer-side links; and a drive mechanism for rotating the base end of the drive link.

2. A robot for a production machine according to claim 1, wherein the drive mechanism comprises a drive shaft rotatably attached to one end of the base arm, one end of the drive shaft being connected to the drive link; a drive lever having one end fixed to the drive shaft; and an air cylinder including a movable rod coupled to the other end of the drive lever.

3. A robot for a production machine according to claim 1, wherein the longer-side links have a length two times that of the drive link; and the distal end of the drive link is coupled to a center portion of one of the longer-side links.

4. A robot for a production machine according to claim 1, wherein the other end of the base arm is supported by a rotation drive unit for rotating the base arm.

5. A robot for a production machine according to claim 4, wherein the rotation drive unit comprises a support shaft projecting from a top face of the base plate; a cylindrical bearing member fixed to the other end of the base arm and rotatably fitted onto the support shaft; a lever projecting horizontally from an outer circumferential surface of the baring member; and an air cylinder including a movable rod whose distal end is rotatably coupled to a distal end of the lever.

6. A robot for a production machine according to claim 1, further comprising an advancement/retraction drive unit for advancing and retracting the base arm.

7. A robot for a production machine according to claim 6, wherein the advancement/retraction drive unit comprises a pair of linear bearings attached to a top face of a support member; a pair of sliders attached to a bottom surface of the base plate and movably supported by the linear bearings; an attachment plate integrally provided on the base plate; and an air cylinder disposed on the top face of the support member and including a movable rod whose distal end is coupled to the attachment plate.

8. A robot for a production machine according to claim 1, wherein the robot is used as a product removal apparatus or an insert-part-loading apparatus in an injection molding machine.

\* \* \* \* \*